Figure 1A:
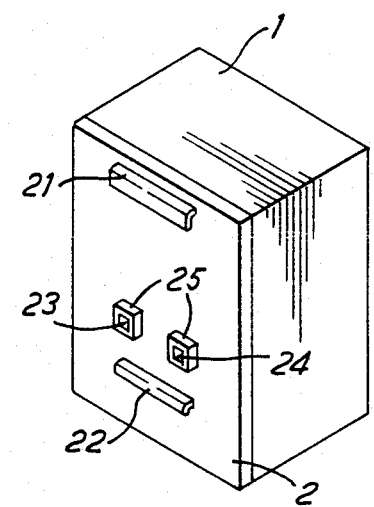

United States Patent [19]

Hawkins

[11] Patent Number: 4,709,974

[45] Date of Patent: Dec. 1, 1987

[54] BATTERY CONNECTOR

[75] Inventor: Clive F. J. Hawkins, Raynes Park, Great Britain

[73] Assignees: PAG Limited, London, United Kingdom; PAG America Ltd., Asheville, N.C.

[21] Appl. No.: 843,375

[22] Filed: Mar. 24, 1986

[30] Foreign Application Priority Data

Oct. 15, 1985 [GB] United Kingdom ................. 8525339

[51] Int. Cl.[4] .......................................... H01R 13/639
[52] U.S. Cl. .................................... 439/345; 439/358
[58] Field of Search ................. 339/75 R, 75 M, 91 R

[56] References Cited

U.S. PATENT DOCUMENTS

| 1,536,322 | 5/1925 | Benjamin | 339/91 F |
|---|---|---|---|
| 1,646,807 | 10/1927 | Benjamin | 339/91 L |
| 2,542,404 | 2/1951 | Ensign | 339/91 R |
| 2,899,669 | 8/1959 | Johanson | 339/91 R |
| 3,335,330 | 8/1967 | Hall | 317/119 |
| 3,564,482 | 2/1971 | Yamanaka et al. | 339/91 |
| 3,588,239 | 6/1971 | Hochstein et al. | 352/243 |
| 3,617,985 | 11/1971 | Kehl | 339/92 M |
| 3,668,605 | 6/1972 | Albert | 339/75 M |
| 3,728,664 | 4/1973 | Hurst | 339/91 R |
| 3,740,696 | 6/1973 | Schleicher et al. | 339/75 M |
| 3,836,885 | 9/1974 | Larsile | 339/75 R |
| 3,967,303 | 6/1976 | Fischer et al. | 354/295 |
| 3,969,796 | 7/1976 | Hodsdon et al. | 339/91 R |
| 3,984,169 | 10/1976 | Armstrong | 339/91 R |
| 4,085,253 | 4/1978 | Johnson | 429/1 |
| 4,218,107 | 8/1980 | Wilson | 339/75 P |
| 4,420,207 | 12/1983 | Nishikawa | 339/75 M |
| 4,586,766 | 5/1986 | Hofmeister | 339/75 M |

FOREIGN PATENT DOCUMENTS

| 0003649 | 8/1979 | European Pat. Off. . |
|---|---|---|
| 0118598 | 9/1984 | European Pat. Off. . |
| 2542933 | 3/1977 | Fed. Rep. of Germany . |
| 2179445 | 11/1973 | France . |
| 2333267 | 6/1977 | France . |
| 2360778 | 3/1978 | France . |
| 56-54754A | 5/1981 | Japan . |
| 58-152231A | 9/1983 | Japan . |
| 59-175554A | 4/1984 | Japan . |
| 1532748 | 11/1978 | United Kingdom . |
| 1571061 | 7/1980 | United Kingdom . |
| 2083296 | 3/1982 | United Kingdom ............. 339/91 R |

Primary Examiner—John McQuade
Attorney, Agent, or Firm—Dority & Manning

[57] ABSTRACT

A battery connector for mechanically and electrically connecting an external battery to a piece of equipment has two plates which mate face to face. On each are complementary, elongated mechanical engagement portions. One engaged first, forms a hinge; the other forms a locking device. Electrical connections are made when the two plates are locked together.

8 Claims, 4 Drawing Figures

BATTERY CONNECTOR

This invention concerns a battery connector by means of which an external battery can be mechanically and electrically connected to a piece of equipment.

Equipment requiring an electrical supply, but used on location e.g. film or television cameras, military equipment, and the like, has to use batteries which are preferably rechargeable, and certainly interchangeable. It is often convenient if the batteries are mounted externally to the equipment. An effective means of mechanical and electrical connection is then required.

One such connection is shown in U.S. Pat. No. 3,728,664, but the mechanical connection means is fragile and easily broken, and could not be used in the rugged conditions encountered by the equipment mentioned. There are also many other proposed means of connection which are either equally fragile, or difficult to locate and engage in sometimes dark and hectic conditions.

Accordingly, the invention proposes a connector unit for connecting two electrical devices comprising two complementary elements for attachment each to a respective one of the devices; wherein each element includes cooperating parts of two mechanical connections and at least one electrical connection; wherein one mechanical connection is at an edge of the elements and comprises an elongated recess on one element and complementary elongated hooked formation on the other, which when interengaged form an elongated hinge means; wherein the other mechanical connection forms a locking device which retains the elements in a locked condition, and wherein the electrical connection of each element is brought into abutment by the hinging movement towards the locked condition.

There are normally at least two electrical connections, and in the locked condition there should be an element of compression between them. The elements are preferably plate like, with the one mechanical connection positioned at the top so that the first device can be 'hung' on the second.

Figure 1B:
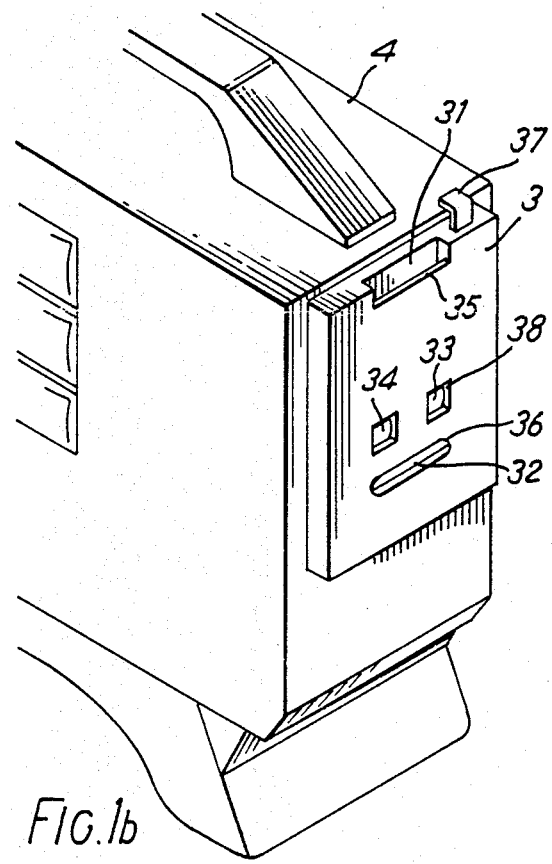
Figure 2A:
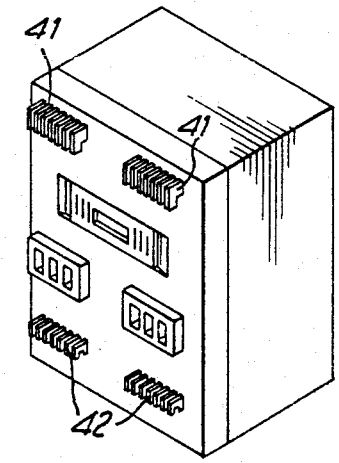
Figure 2B:
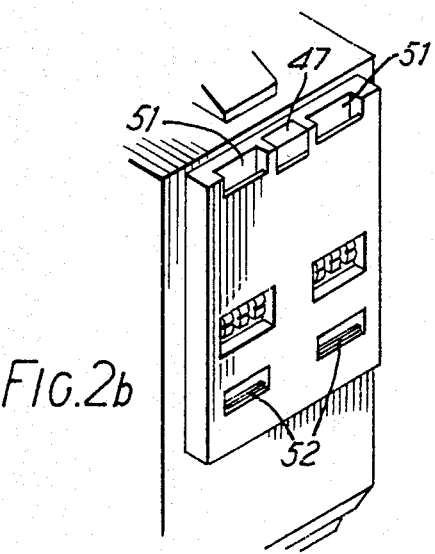

In order that the invention shall be clearly understood, an exemplary embodiment thereof will now be described with reference to the accompanying drawings, in which:

FIGS. 1a and 1b show the two elements of a connector unit according to the invention connected respectively to a battery and a camera; and FIGS. 2a and 2b show the two elements of a slightly modified connector unit.

In the first embodiment illustrated in FIGS. 1a and 1b a battery 1 is mounted on a first plate 2 which forms the first element of the connector unit and which cooperates with a second plate 3 on a television camera 4. Each plate 2,3 has two mechanical connections 21,22 and 31,32 respectively, and two electrical connections 23,24 and 33,34 respectively.

The connections 21,22 are both in the form of an elongated projecting bar of an inverted L cross-section, each thus forming a claw. The corresponding connection 31,32 on plate 3 comprise respectively an elongated recess with an upstanding lip 35, and a slot 36 into which the bar 22 will fit. Within the slot 36 i.e. on the enclosed side of the plate 3, is a sprung locking device (not shown) controlled by a knob 37 at the top. The length of the connections is about a half, and at least a third, of the total width of the unit.

The electrical connections 23,24 are mounted within projecting rims 25, while connection 33,34 lie within recesses 38 which match rims 25 in size. Either or both sets of electrical connections may be sprung.

The battery locks onto the camera as follows. The battery is first allowed to hang from the camera, under its own weight, with the upper claw 21 of the plate 2 engaged in the recess 31 and retained by the lip 35 at the top of the plate 3. The claw and recess are dimensioned so that there is little play between them when mated, and this aligns the two plates automatically. When the battery is pressed towards the camera, it moves with a swinging action, the upper claw 21 and recess 31 acting as a hinge. The battery connections 23,24 enter the camera contact recesses 38. At the same time, the lower claw 22 of the battery plate 2 enters the slot 36 in the plate 3. Behind this slot is a catch-plate which partially obscures the slot. As the lower claw 22 enters the slot 36, it initially pushes the catch-plate downwards. When the lower claw is fully home, the catch-plate rises again, assisted by a spring, trapping the lower claw and preventing it from leaving the slot.

The battery is now mated with the camera and is held firmly so that it will not move in any direction. There is continuous pressure between the electrical contacts and this maintains a good electrical connection. The contacts are protected against rain by virtue of the raised rims 25 surrounding the battery contacts. These walls protrude into the recesses 38 in plate 3, effectively preventing rain-water from reaching the contacts.

The battery unlocks from the camera as follows. The release knob 37 at the top of the equipment plate is an extension of the catch-plate. When the knob is depressed, the catch-plate drops, releasing the lower claw 22. The sprung electrical contacts push the battery away from the camera, and the lower claw 22 moves out of the slot 36. The release knob 37 returns to its rest position. The battery is now hanging by its upper claw 21 from the plate 3, and may be removed at will.

In the second embodiment shown in FIGS. 2a and 2b, exactly the same principles are adopted as in the first. The major change lies in that the mechanical connections 41, 51 and 42, 52 are both divided into two portions, and the knob 47 for releasing the catch plate is positioned centrally on the unit. The knob has also been recessed so that it is flush with the top edge of the unit, so as to avoid the danger of it being caught in clothing, or hit by other apparatus and being bent or broken. The operation is unchanged compared with FIGS. 1a and 1b.

The connector unit of both embodiments is extremely easy to use. The actions of attaching the battery to the equipment and removing it may both be performed without observation and with one hand. This is due to the elongated mechanical connections, and the fact that the mechanical connection(s) on the first plate can be freely moved to and from along the edge of the second plate until they locate in the mechanical connection(s) of the latter.

To attach a battery to the equipment, it is just picked up, hung on the equipment and pressed into place. To remove the battery, the release knob is pressed and the battery lifted off the equipment.

The connector unit is rugged and the battery is firmly attached in any orientation. It can be manufactured in plastics, and can be adapted for additional electrical connections.

As the electrical contacts mate, there is a slight wiping action which ensures a good electrical contact. A rubber sealing ring could be arranged around the outside edge of the plates if complete waterproofing were required.

I claim:

1. A connector unit for connecting two electrical devices together, the connector unit comprising:
   a first connector element and a second connector element, said first and second connector elements being complementary to one another; said first connector element being for attachment to one of the two electrical devices and said second connector element being for attachment to the other of the two electrical devices;
   said first connector element including:
      a first plate;
      at least one upper claw attached to said first plate;
      at least one lower claw attached to said first plate; and
      at least one first electrical connection connected to said first plate;
   said second connector element including:
      a second plate having an upper edge and a lower edge;
      at least one recess defined in said upper edge of said second plate for receiving said at least one upper claw of said first plate to form an elongated hinge means for allowing hinging movement between said first and second plate, said first plate being hangable from said second plate upon receipt of said at least one upper claw by said at least one recess;
      at least one slot defined in said second plate for receiving said at least one lower claw of said first plate when said recess receives said at least one upper claw of said first plate;
      at least one second electrical connection connected to said second plate for coupling with said at least one first electrical connection of said first plate when said recess receives said at least one upper claw and said slot receives said at least one lower claw; and
      locking means associated with said slot for locking said lower claw within said slot.

2. A connector unit as claimed in claim 1, wherein said upper claw is of an elongated L-shape.

3. A connector unit as claimed in claim 1, wherein said lower claw is of an elongated L-shape.

4. A connector unit as claimed in claim 1, wherein said second connector element further includes a spring biased release button for controlling said locking of said locking means.

5. A connector unit as claimed in claim 1, wherein said second connector element further includes a spring biased release button adjacent said upper edge for controlling said locking means.

6. A connector unit as claimed in claim 5, wherein said spring biased release button is substantially centrally located in said upper edge and wherein said at least one recess in said upper edge includes a first recess on one side of said spring biased release button and a second recess on an opposite side of said spring biased release button.

7. A connection unit as claimed in claim 1, wherein said at least one recess in said upper edge of said second connector element is at least one third as long as the length of said upper edge.

8. A connector unit for connecting two electrical devices together, the connector unit comprising:
   a first connector element and a second connector element, said first and second connector elements being complementary to one another; said first connector element being for attachment to one of the two electrical devices and said second connector element being for attachment to the other of the two electrical devices;
   said first connector element including:
      a first plate;
      at least one elongated L-shaped upper claw attached to said first plate;
      at least one elongated L-shaped lower claw attached to said first plate;
      at least one first electrical connection connected to said first plate;
   said second connector element including:
      a second plate having an upper edge and a lower edge;
      at least one recessed portion defined in said upper edge of said second plate for receiving said at least one upper claw of said first plate to form an elongated hinge means for allowing hinging movement between said first and second plate, said first plate being hangable from said second plate upon receipt of said at least one upper claw by said at least one recess;
      at least one slot defind in said second plate for receiving said at least one lower claw of said first plate when said recess receives said at least one upper claw of said first plate;
      at least one second electrical connection connected to said second plate for coupling with said at least one first electrical connection of said first plate when said recess receives said at least one upper claw and said slot receives said at least one lower claw;
      locking means associated with said slot for locking said at least one lower claw within said slot; and
      at least one spring biased release button for controlling said locking of said locking means.

* * * * *